(12) United States Patent
Knoplioch et al.

(10) Patent No.: US 7,218,765 B2
(45) Date of Patent: May 15, 2007

(54) HIGHER-ORDER MOMENT-BASED IMAGE PROJECTION METHOD AND IMAGE PROCESSING APPARATUS

(75) Inventors: Jerome Knoplioch, Paris (FR); Yasuhiro Imai, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 761 days.

(21) Appl. No.: 10/723,972

(22) Filed: Nov. 26, 2003

(65) Prior Publication Data
US 2004/0175025 A1    Sep. 9, 2004

(30) Foreign Application Priority Data
Nov. 28, 2002   (JP) ............... 2002-344974

(51) Int. Cl.
*G06K 9/00*    (2006.01)
(52) U.S. Cl. .............. 382/131; 382/154; 345/419
(58) Field of Classification Search .......... 382/128, 382/129, 130, 131, 132, 133, 134, 154, 285; 378/4, 8, 901; 600/407, 410, 425, 463, 467, 600/920; 345/419
See application file for complete search history.

(56) References Cited
U.S. PATENT DOCUMENTS
5,412,763 A    5/1995 Knoplioch et al.
6,421,413 B1 *  7/2002 Knoplioch et al. ........... 378/19
6,445,762 B1 *  9/2002 Knoplioch et al. ........... 378/8
6,574,297 B2 *  6/2003 Tam ............................. 378/15
6,643,533 B2   11/2003 Knoplioch et al.
6,865,246 B2 *  3/2005 Yang ............................. 378/4

* cited by examiner

*Primary Examiner*—Samir Ahmed
*Assistant Examiner*—Abolfazl Tabatabai
(74) *Attorney, Agent, or Firm*—Carl B. Horton, Esq.; Armstrong Teasdale LLP

(57) ABSTRACT

For the purpose of providing an image projection method for incorporating all data values along a projection axis on a projection image produced from three-dimensional data, a pixel value G at a point of intersection of the projection axis and projection plane is determined as:

$$G = \left| \left( \sum_{i=1}^{n} Vi/n \right)^r - \sum_{i=1}^{n} (Vi/n)^r \right|^{1/r},$$

where the number of three-dimensional data values along the projection axis is denoted by n, a data value is denoted by Vi, and a real number greater than one is denoted by r.

12 Claims, 4 Drawing Sheets

FIG. 4

3D Data Model
TD1

|   | V1 | V2 | V3 | V4 | V5 |
|---|----|----|----|----|----|
| a | 70 | 10 | 70 | 10 | 10 |
| b | 70 | 10 | 70 | 10 | 70 |
| c | 70 | 10 | 10 | 10 | 70 |
| d | 10 | 10 | 10 | 10 | 70 |

G
r = 2

| 27 | A |
| 39 | B |
| 27 | C |
| 16 | D |

$$G = \frac{\left| \left( \sum_{i=1}^{n} (V_i) \right)^r - \sum_{i=1}^{n} (V_i^r) \right|^{\frac{1}{r}}}{n}$$

FIG. 5

3D Data Model
TD2

|   | V1 | V2 | V3 | V4 | V5 |
|---|----|----|----|----|----|
| a | 70 | 0  | 70 | 0  | 0  |
| b | 70 | 0  | 70 | 0  | 70 |
| c | 70 | 0  | 0  | 0  | 70 |
| d | 0  | 0  | 0  | 0  | 70 |

G
r = 2

| 20 | A |
| 34 | B |
| 20 | C |
| 0  | D |

FIG. 6

3D Data Model
TD1

|   | V1 | V2 | V3 | V4 | V5 |
|---|----|----|----|----|----|
| a | 70 | 10 | 70 | 10 | 10 |
| b | 70 | 10 | 70 | 10 | 70 |
| c | 70 | 10 | 10 | 10 | 70 |
| d | 10 | 10 | 10 | 10 | 70 |

MIP

| 70 | A |
| 70 | B |
| 70 | C |
| 70 | D |

FIG. 7

3D Data Model
TD2

|   | V1 | V2 | V3 | V4 | V5 |
|---|----|----|----|----|----|
| a | 70 | 0  | 70 | 0  | 0  |
| b | 70 | 0  | 70 | 0  | 70 |
| c | 70 | 0  | 0  | 0  | 70 |
| d | 0  | 0  | 0  | 0  | 70 |

MIP

| 70 | A |
| 70 | B |
| 70 | C |
| 70 | D |

HIGHER-ORDER MOMENT-BASED IMAGE PROJECTION METHOD AND IMAGE PROCESSING APPARATUS

CROSS REFERENCE TO RELATED APPLICATIONS

This application claims the benefit of Japanese Application No. 2002-344974 filed Nov. 28, 2002.

SUMMARY OF THE INVENTION

The present invention relates to a higher-order moment-based image projection method and an image processing apparatus, and more particularly to a higher-order moment-based image projection method and an image processing apparatus by which all data values along a projection axis are incorporated in a projection image produced from three-dimensional data.

One known image projection method for producing a projection image from three-dimensional data is the maximum intensity projection method.

The maximum intensity projection method is an image projection method involving defining the maximum of three-dimensional data values along an axis perpendicular to a projection plane as the pixel value at the point of intersection of the axis and projection plane, and the method is used to display blood vessels in MRI (magnetic resonance imaging), X-ray CT (computed tomography), and ultrasonic diagnostic apparatuses (cf. "MEDICAL IMAGING DICTIONARY," published by Nikkei Medical Custom Publishing, Inc., sold by Nikkei BP Publishing Center, Inc.).

The maximum intensity projection method, however, poses the problem that only the maximum is incorporated in the projection image and other data values are not incorporated at all. Moreover, another problem is that information on whether the data has only one maximum point or a plurality of maximum points is not incorporated.

SUMMARY OF THE INVENTION

It is therefore an object of the present invention to provide a higher-order moment-based image projection method and an image processing apparatus by which all data values along a projection axis are incorporated in the projection image.

In a first aspect, the present invention provides a higher-order moment-based image projection method, characterized in comprising: when projecting three-dimensional data onto a projection plane, determining a pixel value at a point of intersection of a projection axis and the projection plane based on:

$$P = \left| \left( \sum_{i=1}^{n} Vi/n \right)^r - \sum_{i=1}^{n} (Vi/n)^r \right|^{1/r},$$

where the number of three-dimensional data values along said projection axis is denoted by n, a data value is denoted by Vi, and a real number greater than one is denoted by r.

According to the higher-order moment-based image projection method in the first aspect, a pixel value on the projection plane is determined based on P as represented above, which P is a value obtained by removing $Vi^r$ from $(\Sigma Vi)^r$ and contains all Vi's. Therefore, all values of the data Vi along the projection axis are incorporated in a projection image.

The reason why $Vi^r$ is removed is to prevent one large data value from being dominant. For example, if there exist two data values V1 and V2 and r=2, then $(\Sigma Vi)^r = V1^2 + 2 \cdot V1 \cdot V2 + V2^2$; however, if V1>>V2, then $(\Sigma Vi)^r \approx V1^2$, and V2 will not be incorporated. However, since $(\Sigma Vi)^r - Vi^r = 2 \cdot V1 \cdot V2$, V2 is incorporated even if V1>>V2.

If P=Σ Vi/n is used, it contains all Vi's and it appears that all values of the data Vi along a projection axis may be incorporated in the projection image; however, in fact, one large data value is dominant. For example, if there exist two data values V1 and V2, then Σ Vi=V1+V2, whereas Σ Vi≈V1 if V1>>V2, and hence, V2 will not be incorporated.

In a second aspect, the present invention provides a higher-order moment-based image projection method, characterized in comprising: when projecting three-dimensional data onto a projection plane, determining a pixel value G at a point of intersection of a projection axis and the projection plane as:

$$G = \left| \left( \sum_{i=1}^{n} Vi/n \right)^r - \sum_{i=1}^{n} (Vi/n)^r \right|^{1/r},$$

where the number of three-dimensional data values along said projection axis is denoted by n, a data value is denoted by Vi, and a real number greater than one is denoted by r.

The higher-order moment-based image projection method of the second aspect uses P in the higher-order moment-based image projection method of the first aspect as a pixel value G without modification.

In a third aspect, the present invention provides a higher-order moment-based image projection method, characterized in comprising: determining a pixel value G at a point of intersection of a projection axis and a projection plane as:

$$G = \exp \left\{ \left| \left( \sum_{i=1}^{n} Vi/n \right)^r - \sum_{i=1}^{n} (Vi/n)^r \right|^{1/r} \right\},$$

where the number of three-dimensional data values along said projection axis is denoted by n, a data value is denoted by Vi, and a real number greater than one is denoted by r.

The higher-order moment-based image projection method of the third aspect uses a value of an exponential function of P in the higher-order moment-based image projection method of the first aspect as a pixel value G.

In a fourth aspect, the present invention provides a higher-order moment-based image projection method, characterized in comprising: when projecting three-dimensional data onto a projection plane, determining a pixel value at a point of intersection of a projection axis and the projection plane based on:

$$P = \left| \left( \sum_{i=1}^{n} Vi/n \right)^r - \sum_{i=1}^{n} (Vi^r)/n \right|^{1/r}.$$

where the number of three-dimensional data values along said projection axis is denoted by n, a data value is denoted by Vi, and a real number greater than one is denoted by r.

According to the higher-order moment-based image projection method of the fourth aspect, a pixel value on a projection plane is determined based on P as represented above, which P contains all Vi's. Therefore, all values of the data Vi along a projection axis are incorporated in the projection image.

In a fifth aspect, the present invention provides a higher-order moment-based image projection method, characterized in comprising: determining a pixel value G at a point of intersection of a projection axis and a projection plane as:

$$G = \left| \left( \sum_{i=1}^{n} Vi/n \right)^r - \sum_{i=1}^{n} (Vi^r)/n \right|^{1/r},$$

where the number of three-dimensional data values along said projection axis is denoted by n, a data value is denoted by Vi, and a real number greater than one is denoted by r.

The higher-order moment-based image projection method of the fifth aspect uses P in the higher-order moment-based image projection method of the fourth aspect as a pixel value G without modification.

In a sixth aspect, the present invention provides a higher-order moment-based image projection method, characterized in comprising: determining a pixel value G at a point of intersection of a projection axis and a projection plane as:

$$G = \exp\left\{ \left| \left( \sum_{i=1}^{n} Vi/n \right)^r - \sum_{i=1}^{n} (Vi^r)/n \right|^{1/r} \right\},$$

where the number of three-dimensional data values along said projection axis is denoted by n, a data value is denoted by Vi, and a real number greater than one is denoted by r.

The higher-order moment-based image projection method of the sixth aspect uses a value of an exponential function of P in the higher-order moment-based image projection method of the fourth aspect as a pixel value G.

In a seventh aspect, the present invention provides the higher-order moment-based image projection method having the aforementioned configuration, characterized in that: $2 \leq r \leq 128$.

According to the higher-order moment-based image projection method of the seventh aspect, since the contrast of a projection image varies with the order changing as r=2, 3, 4, . . . , the order r may be selected such that a contrast conforming to the final purpose is attained. The contrast of the projection image is almost constant if the order becomes r=128, 129, 130, . . . , and therefore, it is sufficient to provide an order up to r=128 in practice.

In an eighth aspect, the present invention provides the higher-order moment-based image projection method having the aforementioned configuration, characterized in that: an operator is allowed to change r.

In the higher-order moment-based image projection method of the eighth aspect, since the operator is allowed to change the order r, an order r that provides a contrast desired by the operator can be selected.

In a ninth aspect, the present invention provides an image processing apparatus characterized in comprising: three-dimensional data storage means for storing three-dimensional data; projection direction specifying means for use by an operator to specify a projection direction; higher-order moment-based image projection means for determining a pixel value at a point of intersection of a projection axis and a projection plane based on:

$$P = \left| \left( \sum_{i=1}^{n} Vi/n \right)^r - \sum_{i=1}^{n} (Vi/n)^r \right|^{1/r},$$

where the number of three-dimensional data values along said projection axis is denoted by n, a data value is denoted by Vi, and a real number greater than one is denoted by r; and projection image display means for displaying a projection image.

According to the image processing apparatus of the ninth aspect, the higher-order moment-based image projection method of the first aspect can be suitably implemented.

In a tenth aspect, the present invention provides an image processing apparatus characterized in comprising: three-dimensional data storage means for storing three-dimensional data; projection direction specifying means for use by an operator to specify a projection direction; higher-order moment-based image projection means for determining a pixel value G at a point of intersection of a projection axis and a projection-plane as:

$$G = \left| \left( \sum_{i=1}^{n} Vi/n \right)^r - \sum_{i=1}^{n} (Vi/n)^r \right|^{1/r},$$

where the number of three-dimensional data values along said projection axis is denoted by n, a data value is denoted by Vi, and a real number greater than one is denoted by r; and projection image display means for displaying a projection image.

According to the image processing apparatus of the tenth aspect, the higher-order moment-based image projection method of the second aspect can be suitably implemented.

In an eleventh aspect, the present invention provides an image processing apparatus characterized in comprising: three-dimensional data storage means for storing three-dimensional data; projection direction specifying means for use by an operator to specify a projection direction; higher-order moment-based image projection means for determining a pixel value G at a point of intersection of a projection axis and a projection plane as:

$$G = \exp\left\{ \left| \left( \sum_{i=1}^{n} Vi/n \right)^r - \sum_{i=1}^{n} (Vi/n)^r \right|^{1/r} \right\},$$

where the number of three-dimensional data values along said projection axis is denoted by n, a data value is denoted by Vi, and a real number greater than one is denoted by r; and projection image display means for displaying a projection image.

According to the image processing apparatus of the eleventh aspect, the higher-order moment-based image projection method of the third aspect can be suitably implemented.

In a twelfth aspect, the present invention provides an image processing apparatus characterized in comprising: three-dimensional data storage means for storing three-dimensional data; projection direction specifying means for use by an operator to specify a projection direction; higher-order moment-based image projection means for determining a pixel value at a point of intersection of a projection axis and a projection plane based on:

$$P = \left| \left( \sum_{i=1}^{n} Vi/n \right)^{r} - \sum_{i=1}^{n} (Vi^{r})/n \right|^{1/r},$$

where the number of three-dimensional data values along said projection axis is denoted by n, a data value is denoted by Vi, and a real number greater than one is denoted by r; and projection image display means for displaying a projection image.

According to the image processing apparatus of the twelfth aspect, the higher-order moment-based image projection method of the fourth aspect can be suitably implemented.

In a thirteenth aspect, the present invention provides an image processing apparatus characterized in comprising: three-dimensional data storage means for storing three-dimensional -data; projection direction specifying means for use by an operator to specify a projection direction; higher-order moment-based image projection means for determining a pixel value G at a point of intersection of a projection axis and a projection plane as:

$$G = \left| \left( \sum_{i=1}^{n} Vi/n \right)^{r} - \sum_{i=1}^{n} (Vi^{r})/n \right|^{1/r},$$

where the number of three-dimensional data values along said projection axis is denoted by n, a data value is denoted by Vi, and a real number greater than one is denoted by r; and projection image display means for displaying a projection image.

According to the image processing apparatus of the thirteenth aspect, the higher-order moment-based image projection method of the fifth aspect can be suitably implemented.

In a fourteenth aspect, the present invention provides an image processing apparatus characterized in comprising: three-dimensional data storage means for storing three-dimensional data; projection direction specifying means for use by an operator to specify a projection direction; higher-order moment-based image projection means for determining a pixel value G at a point of intersection of a projection axis and a projection plane as:

$$G = \exp\left\{ \left| \left( \sum_{i=1}^{n} Vi/n \right)^{r} - \sum_{i=1}^{n} (Vi^{r})/n \right|^{1/r} \right\},$$

where the number of three-dimensional data values along said projection axis is denoted by n, a data value is denoted by Vi, and a real number greater than one is denoted by r; and projection image display means for displaying a projection image.

According to the image processing apparatus of the fourteenth aspect, the higher-order moment-based image projection method of the sixth aspect can be suitably implemented.

In a fifteenth aspect, the present invention provides the image processing apparatus having the aforementioned configuration, characterized in that: $2 \leq r \leq 128$.

According to the image processing apparatus of the fifteenth aspect, the higher-order moment-based image projection method of the seventh aspect can be suitably implemented.

In a sixteenth aspect, the present invention provides the image processing apparatus having the aforementioned configuration, characterized in comprising: order specifying means for use by the operator to specify r.

According to the image processing apparatus of the sixteenth aspect, the higher-order moment-based image projection method of the eighth aspect can be suitably implemented.

According to the higher-order moment-based image projection method and the image processing apparatus of the present invention, all data values along a projection axis are incorporated in a projection image produced from three-dimensional data.

Further objects and advantages of the present invention will be apparent from the following description of the preferred embodiments of the invention as illustration in the accompanying drawings.

BRIEF DESCRIPTION OF THE DRAWINGS

FIG. 4 is an explanatory diagram two-dimensionally showing exemplary numeric values for a higher-order moment-based image projection calculation.

FIG. 5 is another explanatory diagram two-dimensionally showing exemplary numeric values for the higher-order moment-based image projection calculation.

FIG. 6 is an explanatory diagram two-dimensionally showing exemplary numeric-values for an image projection calculation employing a maximum intensity projection method.

FIG. 7 is another explanatory diagram two-dimensionally showing exemplary numeric values for the image projection calculation employing the maximum intensity projection method.

DETAILED DESCRIPTION OF THE INVENTION

Embodiments of the present invention will now be described.

First Embodiment

Figure 1:
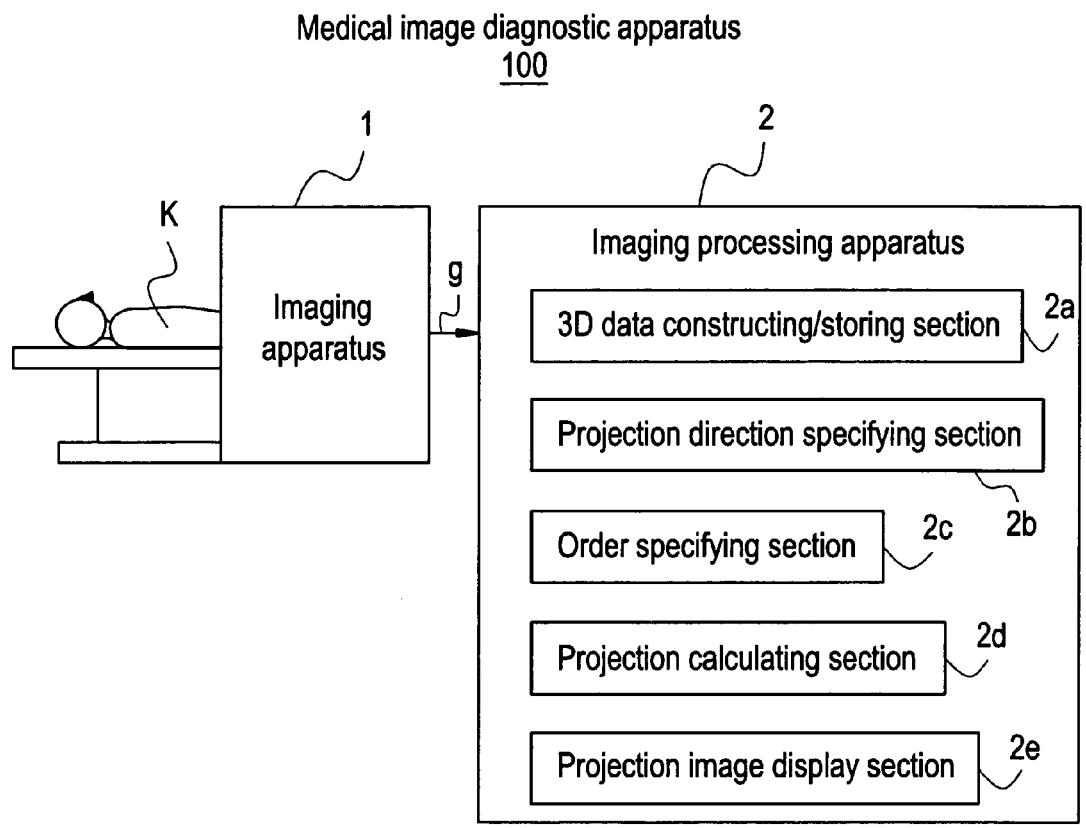
FIG. 1 is a configuration diagram of a medical image diagnostic apparatus in accordance with the present invention.

FIG. 1 is a configuration diagram of a medical image diagnostic apparatus in accordance with a first embodiment.

The medical image diagnostic apparatus 100 comprises an imaging apparatus 1 and an image processing apparatus 2.

The imaging apparatus 1 is an X-ray Cr, MRI or ultrasonic diagnostic apparatus, for example, that images a subject K and passes acquired data to the image processing apparatus 2.

The image processing apparatus 2 comprises a three-dimensional data constructing/storing section 2a for constructing three-dimensional data based on the data passed from the imaging apparatus 1 and storing the three-dimensional data, a projection direction specifying section 2b for use by an operator to specify a projection direction, an order specifying section 2c for use by the operator to specify an order r, a projection calculating section 2d for performing a higher-order moment-based image projection calculation, and a projection image display section 2e for displaying a projection image on a display screen.

Figure 2:
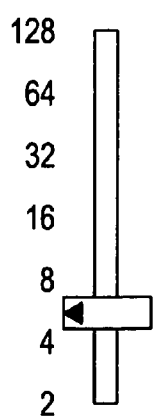
FIG. 2 is an exterior view of a slide lever operated by an operator to change the order r.

FIG. 2 is an external view of a slide lever operated by the operator to change the order r.

By moving the slide lever, the order r can be varied between 2 and 128.

Figure 3:
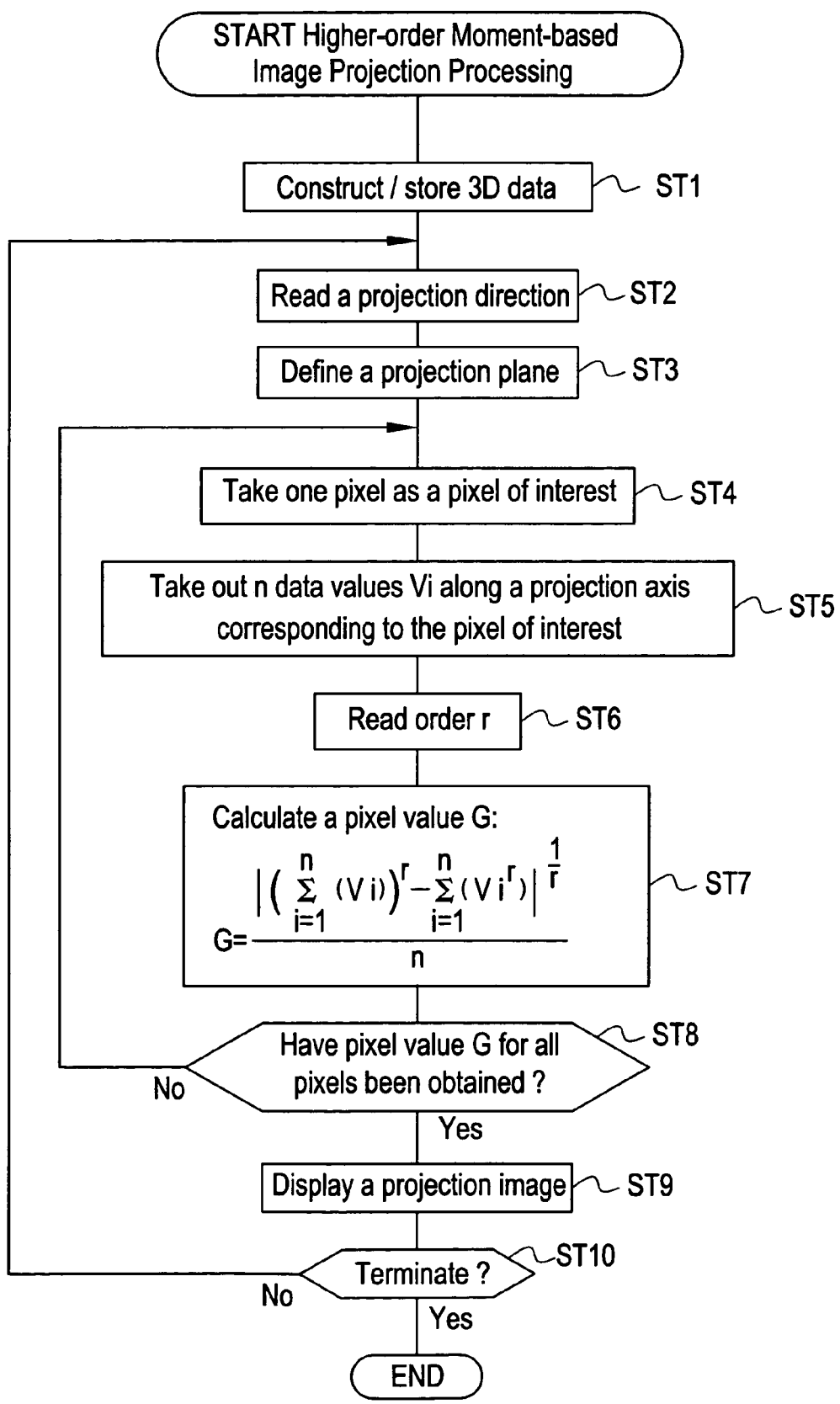
FIG. 3 is a flow chart showing higher-order moment-based image projection processing in accordance with the first embodiment.

FIG. 3 is a flow chart showing the higher-order moment-based image projection processing in the image processing apparatus 2.

At Step ST1, the three-dimensional data constructing/storing section 2a constructs three-dimensional data based on data passed from the imaging apparatus 1, and stores the three-dimensional data.

At Step ST2, the projection direction specifying section 2b reads a projection direction from a device (e.g., a trackball) operated by the operator to specify a projection direction.

At Step ST3, the projection calculating section 2d defines a projection plane perpendicular to the projection direction.

At Step ST4, the projection calculating section 2d takes one pixel on the projection plane as a pixel of interest.

At Step ST5, n data values Vi along the projection axis corresponding to the pixel of interest are taken out from the three-dimensional data.

At Step ST6, the order specifying section 2c reads an order r from a device (e.g., the slide lever shown in FIG. 2) operated by the operator to specify an order r.

At Step ST7, the projection calculating section 2d calculates a pixel value G according to the following equation:

$$G = \left| \left( \sum_{i=1}^{n} Vi/n \right)^r - \sum_{i=1}^{n} (Vi/n)^r \right|^{1/r}.$$

At Step ST8, the projection calculating section 2d repeats Steps ST4–ST7 until pixel values G for all pixels are obtained.

At Step ST9, the projection image display section 2e displays an obtained projection image on a display screen.

At Step ST10, if the operator issues a command to terminate the processing, the processing is terminated; otherwise, the flow goes back to Step ST2.

FIGS. 4 and 5 are explanatory diagrams two-dimensionally showing exemplary numeric values for the higher-order moment-based image projection calculation. The order r=2 is assumed.

FIG. 4 shows pixel values of pixels A, B, C and D of a projection image obtained by projecting three-dimensional data TD1 according to higher-order moment-based image projection. The projection axes a, b, c and d are projection axes corresponding to the pixels A, B, C and D, respectively.

FIG. 5 shows pixel values of pixels A, B, C and D of a projection image obtained by projecting three-dimensional data TD2 according to higher-order moment-based image projection.

FIGS. 6 and 7 are explanatory diagrams two-dimensionally showing exemplary numeric values for an image projection calculation employing the maximum intensity projection method.

FIG. 6 shows pixel values of pixels A, B, C and D of a projection image obtained by projecting the three-dimensional data TD1 according to image projection employing the maximum intensity projection method.

FIG. 7 shows pixel values of pixels A, B, C and D of a projection image obtained by projecting the three-dimensional data TD2 according to image projection employing the maximum intensity projection method.

As can be seen by comparing FIGS. 4 and 5 in which a higher-order moment is employed, data values other than the maximum along a projection axis are incorporated in the projection image (for example, the pixel values are different depending on whether the minimum along the projection axis is 10 or 0). On the other hand, as can be seen by comparing FIGS. 6 and 7 in which the maximum intensity projection method is employed, data values other than the maximum along a projection axis are not incorporated at all on the projection image (for example, the pixel values are equal to the maximum, 70, regardless of whether the minimum along the projection axis is 10 or 0).

This means that, for example, whether only a bone or both a bone and overlying blood vessel are present in the projection direction cannot be discerned on a projection image according to the maximum intensity projection method, but can be discerned on a projection image according to the present invention.

Moreover, as can be seen by comparing FIGS. 4 and 6, information on whether the data has only one maximum point or a plurality of maximum points is incorporated in the projection image in FIG. 4 in which a higher moment is employed (i.e., the pixel values are different depending on the number of the maximums, 70, along the projection axis). On the other hand, in FIG. 6 in which the maximum intensity projection method is employed, information on whether the data has only one maximum point or a plurality of maximum points is not incorporated at all on the projection image (i.e., the pixel value is 70 regardless of the number of the maximums, 70, along the projection axis).

The same can be seen by comparing FIGS. 5 and 7.

This means that, for example, whether only one bone or a plurality of overlying bones are present in the projection direction cannot be discerned on a projection image according to the maximum intensity projection method, but can be discerned on a projection image according to the present invention.

Second Embodiment

At Step ST7 of FIG. 3, the projection calculating section 2d may calculate the pixel value G according to the following equation:

$$G = \exp\left\{\left|\left(\sum_{i=1}^{n} Vi/n\right)^r - \sum_{i=1}^{n}(Vi/n)^r\right|^{1/r}\right\}.$$

This pixel value G enables all data values along the projection axis to be incorporated in the projection image.

Third Embodiment

Figure 8:
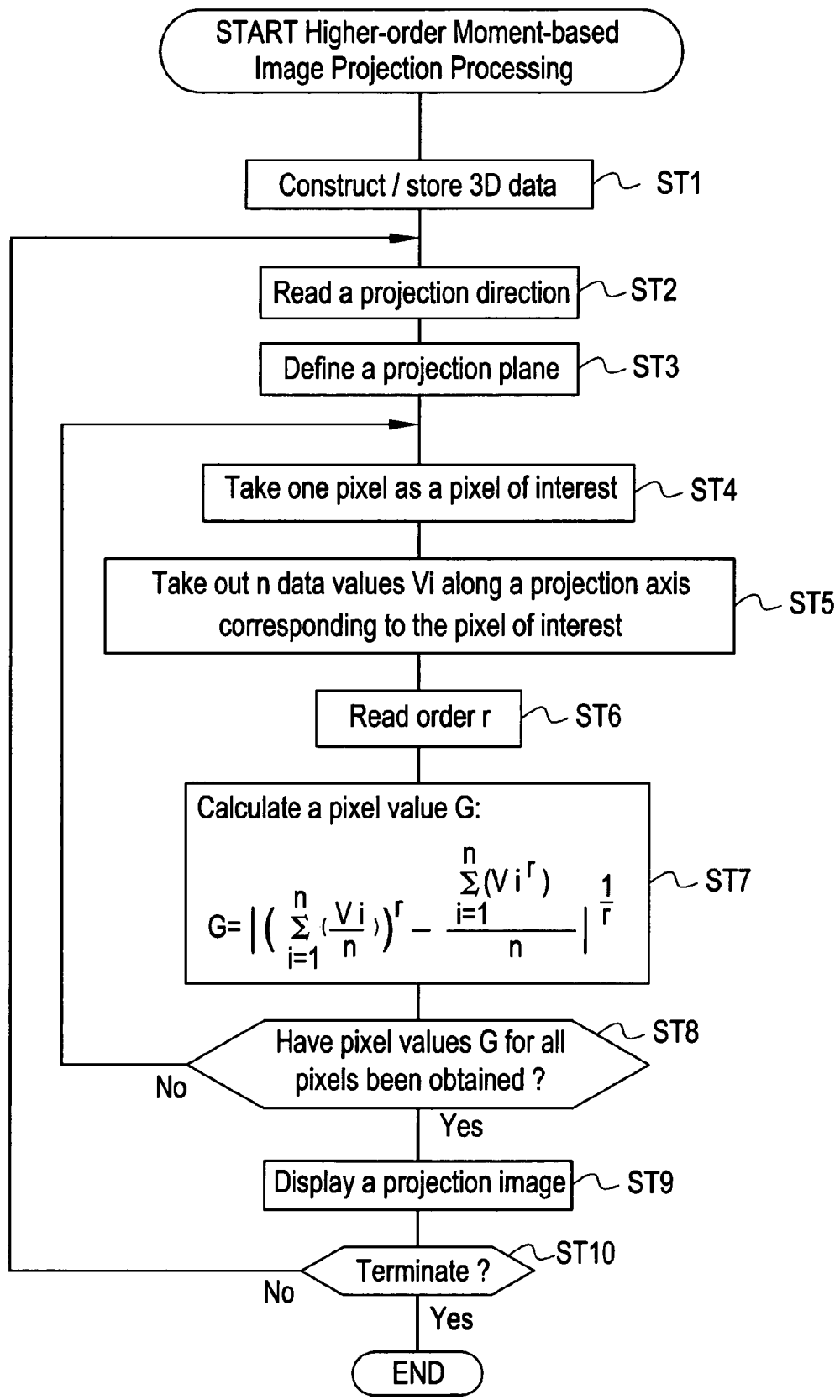
FIG. 8 is a flow chart showing higher-order moment-based image projection processing in accordance with a third embodiment.

FIG. 8 is a flow chart showing the higher-order moment-based image projection processing in the image processing apparatus 2. The flow chart is the same as that in FIG. 3 except that Step ST7 in FIG. 3 is changed to Step ST7'. Thus, only Step ST7' will be explained below.

At Step ST7', the projection calculating section 2d calculates the pixel value G according to the following equation:

$$G = \left|\left(\sum_{i=1}^{n} Vi/n\right)^r - \sum_{i=1}^{n}(Vi^r)/n\right|^{1/r}.$$

This pixel value G also enables all data values along the projection axis to be incorporated in the projection image, and sometimes gives a better result than the first embodiment.

Fourth Embodiment

At Step ST7' in FIG. 8, the projection calculating section 2d may calculate the pixel value G according to the following equation:

$$G = \exp\left\{\left|\left(\sum_{i=1}^{n} Vi/n\right)^r - \sum_{i=1}^{n}(Vi^r)/n\right|^{1/r}\right\},$$

This pixel value G also enables all data values along the projection axis to be incorporated in the projection image, and sometimes gives a better result than the second embodiment.

Any one of the pixel values G obtained in the first–fourth embodiments and other functions G(P) may be appropriately selected according to the purpose of producing the image, or preference.

Many widely different embodiments of the invention may be configured without departing from the spirit and the scope of the invention. It should be understood that the present invention is not limited to the specific embodiments described in the specification, except as defined in the appended claims.

The invention claimed is:

1. A higher-order moment-based image projection method comprising: when projecting three-dimensional data onto a projection plane, determining a pixel value at a point of intersection of a projection axis and the projection plane based on:

$$P = \left|\left(\sum_{i=1}^{n} Vi/n\right)^r - \sum_{i=1}^{n}(Vi/n)^r\right|^{1/r},$$

where the number of three-dimensional data values along said projection axis is denoted by n, a data value is denoted by Vi, and a real number greater than one is denoted by r.

2. The higher-order moment-based image projection method of claim 1, wherein $2 \leq r \leq 128$.

3. The higher-order moment-based image projection method of claim 1, wherein an operator is allowed to change r.

4. An image processing apparatus comprising: three-dimensional data storage means for storing three-dimensional data; projection direction specifying means for use by an operator to specify a projection direction; higher-order moment-based image projection means for determining a pixel value at a point of intersection of a projection axis and a projection plane based on:

$$P = \left|\left(\sum_{i=1}^{n} Vi/n\right)^r - \sum_{i=1}^{n}(Vi/n)^r\right|^{1/r},$$

where the number of three-dimensional data values along said projection axis is denoted by n, a data value is denoted by Vi, and a real number greater than one is denoted by r; and projection image display means for displaying a projection image.

5. The image processing apparatus of claim 4, wherein $2 \leq r \leq 128$.

6. The image processing apparatus of claim 4, further comprising: order specifying means for use by the operator to specify r.

7. An image processing apparatus comprising: three-dimensional data storage means for storing three-dimensional data; projection direction specifying means for use by an operator to specify a projection direction; higher-order moment-based image projection means for determining a pixel value G at a point of intersection of a projection axis and a projection plane as:

$$G = \left|\left(\sum_{i=1}^{n} Vi/n\right)^r - \sum_{i=1}^{n}(Vi/n)^r\right|^{1/r},$$

where the number of three-dimensional data values along said projection axis is denoted by n, a data value is denoted by Vi, and a real number greater than one is denoted by r; and projection image display means for displaying a projection image.

8. The image processing apparatus of claim 7, wherein $2 \leq r \leq 128$.

9. The image processing apparatus of claim 7, further comprising: order specifying means for use by the operator to specify r.

10. A higher-order moment-based image projection method comprising: when projecting three-dimensional data onto a projection plane, determining a pixel value at a point of intersection of a projection axis and the projection plane based on:

$$P = \exp\left|\left(\sum_{i=1}^{n} Vi/n\right)^r - \sum_{i=1}^{n} (Vi/n)^r\right|^{1/r},$$

where the number of three-dimensional data values along said projection axis is denoted by n, a data value is denoted by Vi, and a real number greater than one is denoted by r.

11. A higher-order moment-based image projection method comprising: when projecting three-dimensional data onto a projection plane, determining a pixel value at a point of intersection of a projection axis and the projection plane based on:

$$P = \left|\left(\sum_{i=1}^{n} Vi/n\right)^r - \sum_{i=1}^{n} (Vi/n)^r\right|^{1/r},$$

where the number of three-dimensional data values along said projection axis is denoted by n, a data value is denoted by Vi, and a real number greater than one is denoted by r.

12. A higher-order moment-based image projection method comprising: when projecting three-dimensional data onto a projection plane, determining a pixel value at a point of intersection of a projection axis and the projection plane based on:

$$P = \exp\left|\left(\sum_{i=1}^{n} Vi/n\right)^r - \sum_{i=1}^{n} (Vi^r/n)^r\right|^{1/r},$$

where the number of three-dimensional data values along said projection axis is denoted by n, a data value is denoted by Vi, and a real number greater than one is denoted by r.

* * * * *

UNITED STATES PATENT AND TRADEMARK OFFICE
CERTIFICATE OF CORRECTION

PATENT NO. : 7,218,765 B2  Page 1 of 1
APPLICATION NO. : 10/723972
DATED : May 15, 2007
INVENTOR(S) : Knoplioch et al.

It is certified that error appears in the above-identified patent and that said Letters Patent is hereby corrected as shown below:

In Claim 11, column 11, line 18, delete " $P = \left| \left( \sum_{i=1}^{n} Vi/n \right)^r - \sum_{i=1}^{n} (Vi/n)^r \right|^{1/r}$ , " and insert therefor -- $P = \left| \left( \sum_{i=1}^{n} Vi/n \right)^r - \sum_{i=1}^{n} (Vi^r/n) \right|^{1/r}$ , --.

In Claim 12, column 12, line 13, delete " $P = \left| \left( \sum_{i=1}^{n} Vi/n \right)^r - \sum_{i=1}^{n} (Vi^r/n) \right|^{1/r}$ , " and insert therefor -- $P = \exp \left| \left( \sum_{i=1}^{n} Vi/n \right)^r - \sum_{i=1}^{n} (Vi^r/n) \right|^{1/r}$ , --.

Signed and Sealed this

Thirty-first Day of March, 2009

JOHN DOLL
*Acting Director of the United States Patent and Trademark Office*